United States Patent [19]
Nishio et al.

[11] Patent Number: 5,865,708
[45] Date of Patent: Feb. 2, 1999

[54] GEAR SHIFT CONTROL APPARATUS

[75] Inventors: Motoharu Nishio, Yokohama; Toshikazu Oshidari, Yokosuka, both of Japan

[73] Assignee: Nissan Motor Co., Ltd, Yokohama, Japan

[21] Appl. No.: 786,959

[22] Filed: Jan. 23, 1997

[30] Foreign Application Priority Data

Jan. 24, 1996 [JP] Japan ................................ 8-009867

[51] Int. Cl.$^6$ .......................... F16H 61/08; F16H 61/06
[52] U.S. Cl. ........................................... 477/155; 477/154
[58] Field of Search ................................. 477/143, 154, 477/155, 156, 161

[56] References Cited

U.S. PATENT DOCUMENTS

| | | | |
|---|---|---|---|
| 4,653,350 | 3/1987 | Downs et al. | 477/154 |
| 4,870,581 | 9/1989 | Ito et al. | 477/154 |
| 4,969,098 | 11/1990 | Leising et al. | 477/154 |
| 4,998,451 | 3/1991 | Sano | 477/143 |
| 5,063,814 | 11/1991 | Baba et al. | 477/154 |

FOREIGN PATENT DOCUMENTS 5-157168   6/1993   Japan .

*Primary Examiner*—Charles A. Marmor
*Assistant Examiner*—Sherry Lynn Estremsky
*Attorney, Agent, or Firm*—Foley & Lardner

[57] ABSTRACT

A gear shift control apparatus for use in an automatic transmission having friction elements each of which is operable on a working fluid pressure applied thereto in an engaged and released state. A change is produced from the current gear ratio to a desired gear ratio by increasing the pressure of the working fluid to a first one of the friction elements at a first rate to engage the first friction element while decreasing the pressure of the working fluid to a second one of the friction elements at a second rate to release the second friction element. A time elapsed for a torque phase in the gear ratio change is measured. The first rate is decreased when the measured torque phase time is shorter than a predetermined value. The second rate is increased when the measured torque phase time is longer than the predetermined value.

24 Claims, 10 Drawing Sheets

GEAR SHIFT CONTROL APPARATUS

BACKGROUND OF THE INVENTION

This invention relates to a gear shift control apparatus for use with an automatic transmission having friction elements, such as clutches, brakes and servos, pressurized and vented to cause the transmission gear ratio to change.

For example, Japanese Patent Kokai No. 5-157168 discloses a gear shift control apparatus adapted to produce a change from the current gear ratio to a desired gear ratio by increasing the pressure of the working fluid to a first friction element to engage the first friction element while decreasing the pressure of the working fluid to a second friction element, inversely to the working fluid pressure increase, to release the second friction element. If the first and second friction elements are subject to different friction factor changes, however, the engagement of the first friction element will be advanced or retarded with respect to the disengagement of the second friction element, causing a great torque reduction or engine racing during the torque phase.

SUMMARY OF THE INVENTION

It is a main object of the invention to provide an improved gear shift control apparatus which can ensure an appropriate torque phase time regardless of whether the friction elements are subject to different friction factor changes.

There is provided, in accordance with the invention, a gear shift control apparatus for use in an automotive vehicle including an engine and an automatic transmission having friction elements. Each of the friction elements is operable on a working fluid pressure applied thereto in an engaged and released state. The gear shift control apparatus comprises means for increasing the pressure of the working fluid to a first one of the friction elements at a first rate to engage the first friction element while decreasing the pressure of the working fluid to a second one of the friction elements at a second rate to release the second friction element so as to produce a gear ratio change, means measuring a time elapsed for a torque phase in the gear ratio change, and means for decreasing the first rate when the measured torque phase time is shorter than a predetermined value.

In another aspect of the invention, there is provided a gear shift control apparatus for use in an automotive vehicle including an engine and an automatic transmission having friction elements. Each of the friction elements is operable on a working fluid pressure applied thereto in an engaged and released state. The gear shift control apparatus comprises means for increasing the pressure of the working fluid to a first one of the friction elements at a first rate to engage the first friction element while decreasing the pressure of the working fluid to a second one of the friction elements at a second rate to release the second friction element so as to produce a gear ratio change, means measuring a time elapsed for a torque phase in the gear ratio change, and means for increasing the second rate when the measured torque phase time is longer than a predetermined value.

In still another aspect of the invention, there is provided a gear shift control apparatus for use in an automotive vehicle including an engine and an automatic transmission having friction elements. Each of the friction elements is operable on a working fluid pressure applied thereto in an engaged and released state. The gear shift control apparatus comprises means for increasing the pressure of the working fluid to a first one of the friction elements at a first rate to engage the first friction element while decreasing the pressure of the working fluid to a second one of the friction elements at a second rate to release the second friction element so as to produce a gear ratio change, means measuring a time elapsed for a torque phase in the gear ratio change, means for decreasing the first rate when the measured torque phase time is shorter than a predetermined value, and means for increasing the second rate when the measured torque phase time is longer than the predetermined value.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
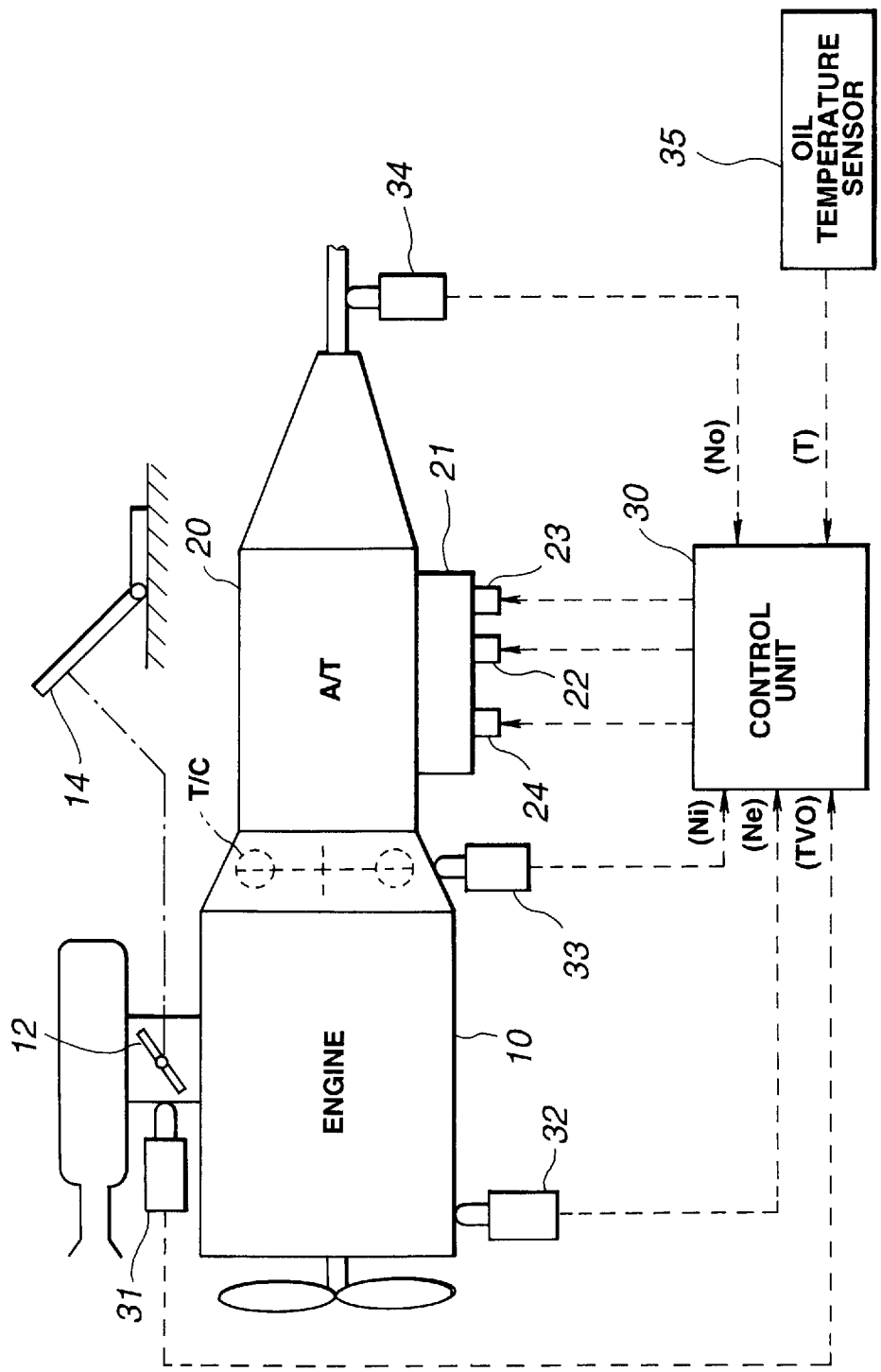
FIG. 1 is a schematic block diagram showing one embodiment of a gear shift control apparatus made in accordance with the invention.

With reference to the drawings and in particular to FIG. 1, there is shown a schematic block diagram of a gear shift control apparatus embodying the invention. The gear shift control apparatus is used with an automotive vehicle having an internal combustion engine 10 from which a drive is transmitted through a torque converter T/C to an automatic transmission 20. The engine 10 has a throttle valve 12 situated within the engine induction passage for controlling the amount of air permitted to enter the engine. The throttle valve 12 is connected by a mechanical linkage to an accelerator pedal 14. The degree to which the acceleration pedal 14 is depressed controls the degree of rotation of the throttle valve 12. The automatic transmission 20 has various friction elements each of which operates on a working fluid pressure applied thereto in an engaged and released state. The friction elements are selectively engaged and released, according to a shift schedule, to selectively establish a desired transmission gear ratio. The friction elements, such as clutches, brakes and servos, are pressurized or vented so as to cause the transmission gear ratio to change through the operation of a control valve unit 21 which is shown as including three solenoid operated control valves 22, 23 and 24. In this embodiment, the control unit 21 produces a change from one gear ratio to another by increasing the pressure Pc of the working fluid to a certain friction element to be engaged while decreasing the pressure Po of the working fluid to another friction element to be released.

The operation of the solenoid operated control valves 22, 23 and 24 is controlled by a control unit 30 based on various conditions including engine throttle position TV0, engine output shaft speed Ne, torque converter output shaft speed Ni, transmission output shaft speed No and transmission fluid temperature T. Thus, an engine throttle position sensor 31, an engine output shaft speed sensor 32, a torque converter output shaft speed sensor 33, a transmission output shaft speed sensor 34 and a transmission fluid temperature sensor 35 are connected to the control unit 30. The engine throttle position sensor 31 is associated with the throttle valve 31 and it produces a voltage signal proportional to the degree TV0 of rotation of the throttle valve 31. The engine output shaft speed sensor 32 is associated with the engine distributor and it produces a pulse signal of a repetitive rate proportional to the engine output shaft speed Ne. The torque converter output shaft speed sensor 33 is provided at a position for sensing the speed Ni of rotation of the transmission input shaft. The transmission output shaft speed sensor 34 is located at a position for sensing the speed No of rotation of the transmission output shaft. The transmission fluid temperature sensor 35 is provided at a position for sensing the temperature T of the working fluid introduced into the automatic transmission 20.

The control unit 30 employs a digital computer which includes a central processing unit (CPU), a random access memory (RAM), a read only memory (ROM) and an input/output control unit (I/O). The central processing unit communicates with the rest of the computer via data bus. The input/output control unit includes an analog-to-digital converter which receives analog signal from the various sensors and it converts the received signal into corresponding digital signals for application of the central processing unit. The read only memory contains the programs for operating the central processing unit and further appropriate data in look-up tables used for gear shift control.

Figure 2:
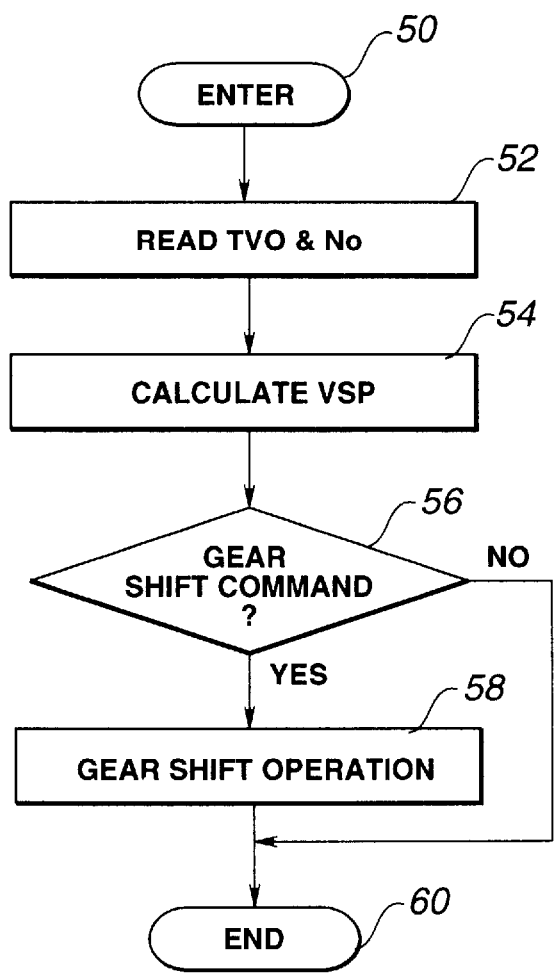
FIG. 2 is a flow diagram illustrating the programming of the digital computer as it is used for gear shift control.
Figure 3:
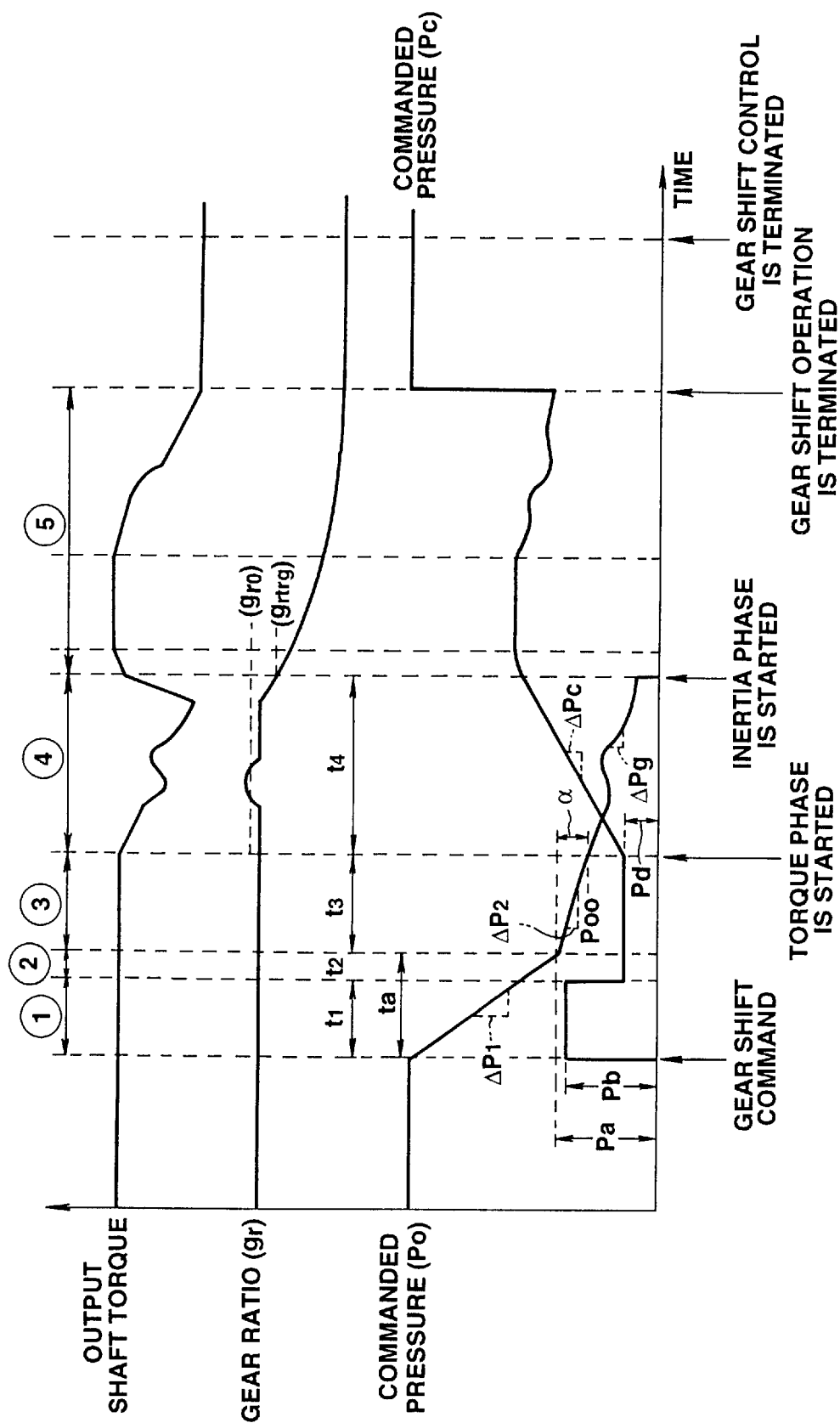
FIG. 3 is a time chart used in explaining the operation of the gear shift control apparatus of the invention.

FIG. 2 is a flow diagram illustrating the programming of the digital computer as it is used for gear shift control. The computer program is entered at the point 50. At the point 52, the various inputs are read into the computer memory via the data bus. These inputs include throttle position TV0 and transmission output shaft speed No. At the point 54, the vehicle speed VSP is calculated based on the read transmission output shaft speed No. At the point 56 in the program, a determination is made as to whether or not the gear ratio is required to change. For this determination, a desired or target gear ratio is calculated from a shift schedule stored in look-up tables, in which two variables, such as throttle position TV0 and vehicle VSP speed, are mutually related and stored by reference to a particular gear ratio. If the answer to this question is "yes", then it means that the desired gear ratio is different from the current gear ratio and the program proceeds to the point 58 where a command is produced to operate the control valves 21, 22 and 23 so as to produce a change from the current gear ratio to the desired gear ratio and then to the end point 60. If the desired gear ratio is the same as the current gear ratio, then the program proceeds from the point 56 directly to the end point 60. The gear shift control will be described as divided into five stages ① to ⑤, as shown in FIG. 3.

Figure 4:
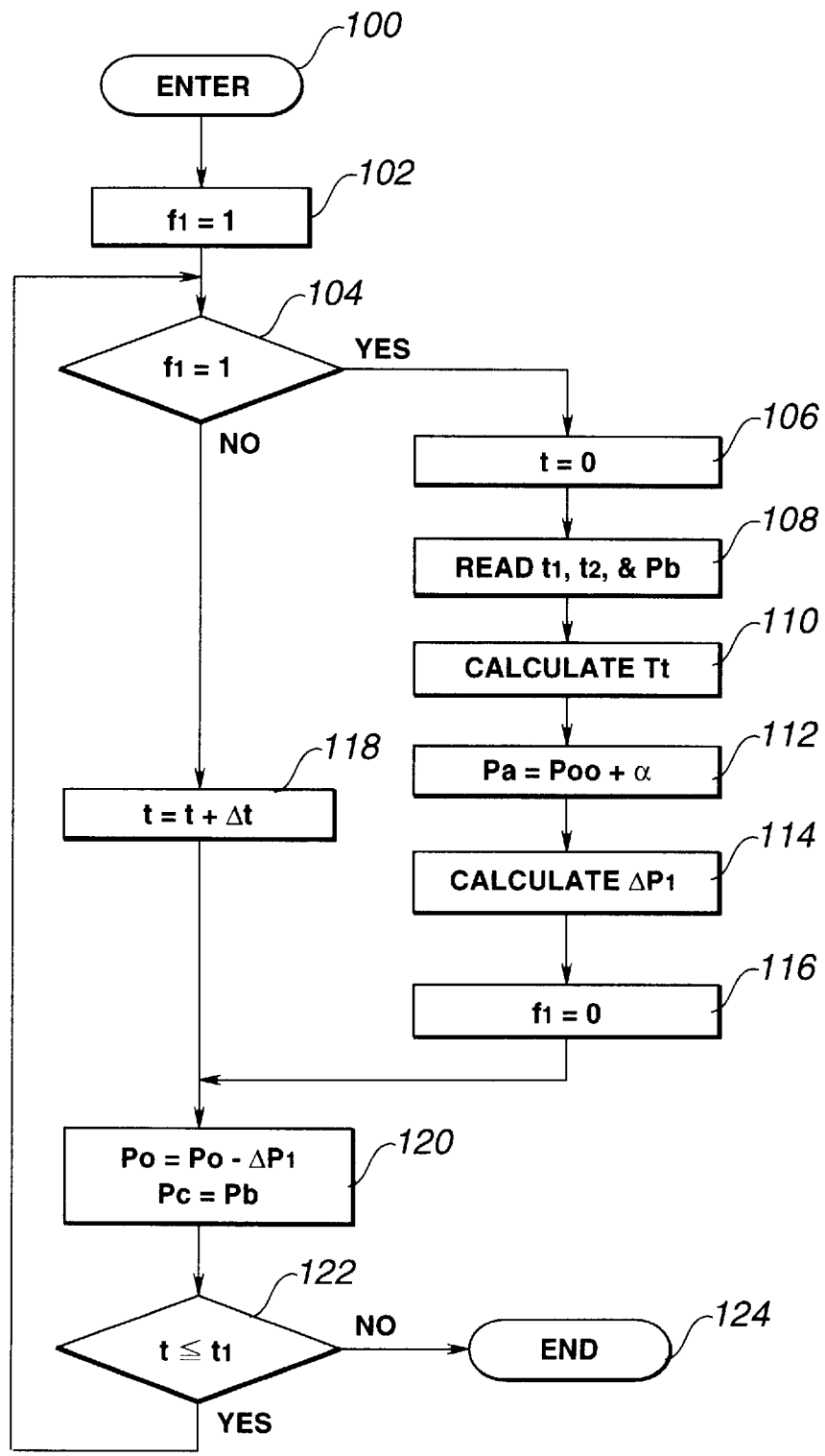
FIG. 4 is a flow diagram illustrating the programming of the digital computer as it is used for the first stage ① of the gear shift control.

FIG. 4 is a flow diagram illustrating the programming of the digital computer as it is used for the first stage ① of the gear shift control. The computer program is entered at the point 100 at uniform intervals of time Δt, for example 0.2 seconds. At the point 102, a flag f1 is set at 1 to indicate that the first stage ① is initiated. At the point 104, a determination is made as to whether or not the flag f1 has been set. If the answer to this question is "yes", then the program proceeds to the point 106. Otherwise, the program proceeds to the point 118 where the count of a timer t is incremented by one step and then to the point 120. The timer t accumulates a count corresponding to the time elapsed from the initiation of the first stage ①.

At the point 106 in the program, the timer t is reset to zero. At the point 108, the period of time t1 required for the first stage ① of the gear shift control, the period of time t2 required for the second stage ② of the gear shift control, and the commanded precharge pressure Pb required for rapid completion of the loss stroke of the friction element to be engaged are read into the computer memory. The period of time t1 required for the first stage of the gear shift control corresponds to the time required for completion of the loss stroke of the friction element to be engaged at the commanded precharge pressure Pb and it is calculated from a look-up table which defines it as a function of the temperature T of the working fluid used in the transmission 20. The period of time t2 required for the second stage of the gear shift control corresponds to a spare time added to the period of time t1 required for the first stage of the gear shift control. If the pressure Po of the working fluid to the friction element to be released decreases in a short time, the pressure Po should decrease at such a rapid rate that the pressure Po undershoots at the termination of the first stage of the gear shift control. For this reason, the spare time t2 is added to the period of time t1 required for the first stage of the gear shift control.

At the point 110 in the program, the turbine torque Tt is calculated from a torque converter characteristic diagram as a function of engine speed (torque converter input speed) Ne and transmission input speed (torque converter output speed) Ni. For this calculation, the speed ratio Ni/No of the torque converter T/C is calculated. The torque converter characteristic diagram is used to calculate the torque ratio and the torque capacity coefficient based on the torque converter speed ratio Ni/No. The torque ratio and the torque capacity coefficient are multiplied to calculate the turbine torque (transmission input torque) Tt. At the point 112, a spare pressure α is added to a pressure Poo to calculate the pressure Pa. The pressure Poo (FIG. 3) is a minimum pressure required to engage the friction element to be engaged at the turbine torque (transmission input torque) Tt. At the point 114, the central processing unit calculates the gradient ΔP1 at which the pressure Po of the working fluid to the friction element to be released is to be decreased to the calculated pressure value Pa in a time ta (=t1+t2) after the gear shift command is produced. At the point 116, the flag f1 is cleared to zero. Following this, the program proceeds to the point 120.

At the point 120 in the program, the commanded value for the pressure Po of the working fluid to the friction element to be released is decreased by the calculated gradient value ΔP1 and the commanded value for the pressure Pc of the working fluid to the friction element to be engaged is set at the commanded precharge pressure Pb read at the point 108. At the point 122, a determination is made as to whether or not the timer count t is equal to or less than the time t1. If the answer to this question is "yes", then the program is returned to the point 104. Otherwise, the program proceeds to the end point 124.

During the period of time t1 of the first stage ①of the gear shift control, the commanded value for the pressure Po of the working fluid to the friction element to be released decreases at a rate ΔP1, whereas the commanded value for the pressure Pc of the working fluid to the friction element to be engaged remains at the commanded precharge pressure Pb so that the loss stroke of the friction element to be engaged is completed at the end of the first stage ① of the gear shift control, as shown in FIG. 3.

Figure 5:
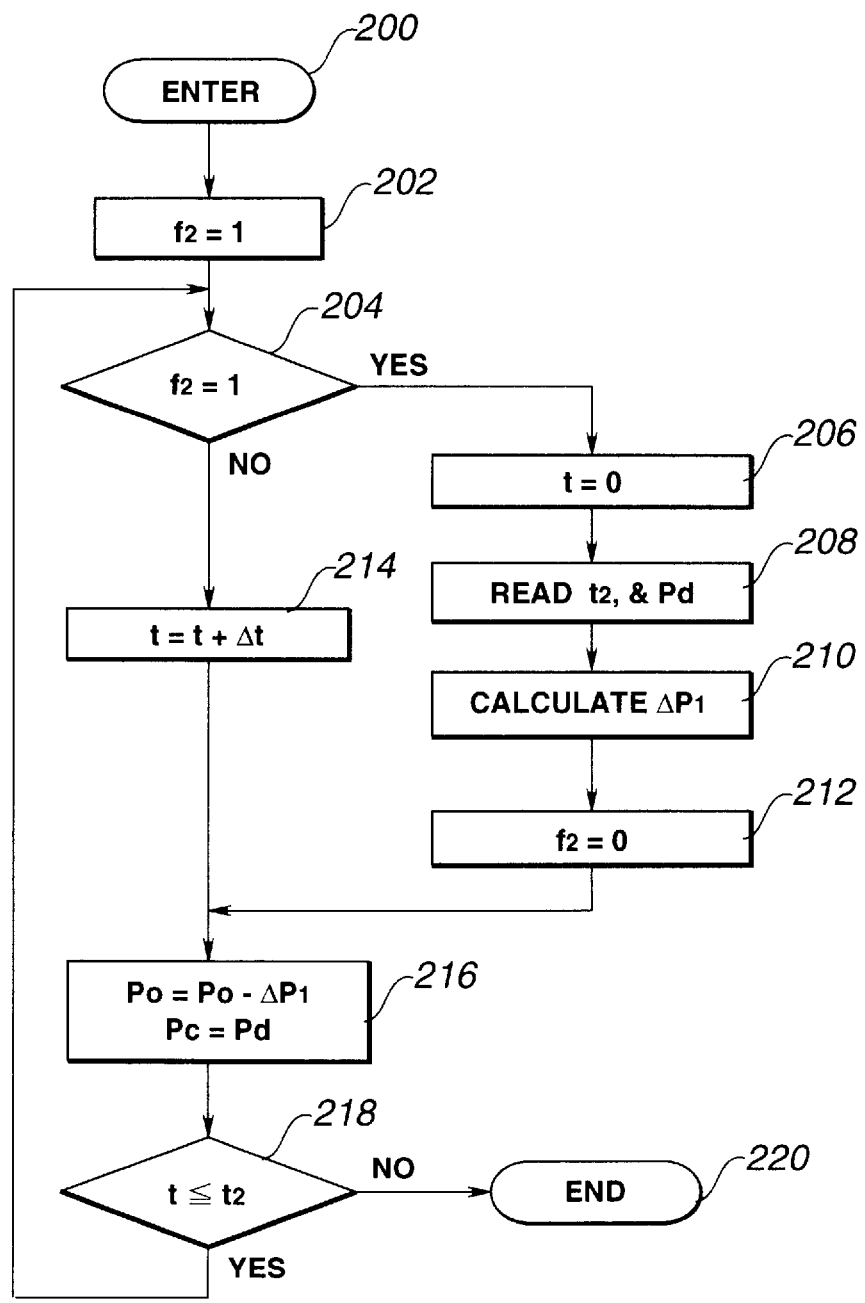
FIG. 5 is a flow diagram illustrating the programming of the digital computer as it is used for the second stage ② of the gear shift control.

FIG. 5 is a flow diagram illustrating the programming of the digital computer as it is used for the second stage ② of the gear shift control. The computer program is entered at the point 200 which corresponds to the point 124 of FIG. 4. At the point 202, a flag f2 is set at 1 to indicate that the second stage ② is initiated. At the point 204, a determination is made as to whether or not the flag f2 has been set. If the answer to this question is "yes", then the program proceeds to the point 206. Otherwise, the program proceeds to the point 214 where the count of the timer t is incremented by one step and then to the point 216. The timer t accumulates a count corresponding to the time elapsed from the initiation of the second stage ②.

At the point 206 in the program, the timer t is reset to zero. At the point 208, the period of time t2 required for the second stage ② of the gear shift control and the commanded precharge pressure Pd corresponding to the resilient force of the return spring upon the termination of the loss stroke of the friction element to be engaged are read into the computer memory. The period of time t2 required for the second stage of the gear shift control corresponds to a spare time added to the period of time t1 required for the first stage of the gear shift control. If the pressure Po of the working fluid to the friction element to be released is decreased in a short time, the pressure Po should be decreased at such a rapid rate that the pressure Po undershoots at the termination of the first stage of the gear shift control. For this reason, the spare time t2 is added to the period of time t1 required for the first stage of the gear shift control. The pressure Pd corresponds to the working fluid pressure required to complete the loss stroke of the friction element to be engaged. At the point 210 in the program, the central processing unit calculates the gradient ΔP1 at which the pressure Po of the working fluid to the friction element to be released decreases to the calculated pressure value Pa in a time ta (=t1+t2) after the gear shift command is produced. At the point 212, the flag f2 is cleared to zero. Following this, the program proceeds to the point 216.

At the point 216 in the program, the commanded value for the pressure Po of the working fluid to the friction element to be released is decreased by the calculated gradient value ΔP1 and the commanded value Pc for the pressure of the working fluid to the friction element to be engaged is set at the commanded precharge pressure Pd read at the point 208. At the point 218, a determination is made as to whether or not the timer count t is equal to or less than the time t2. If the answer to this question is "yes", then the program is returned to the point 204. Otherwise, the program proceeds to the end point 220.

During the period of time t2 of the second stage ② of the gear shift control, the commanded value for the pressure Po of the working fluid to the friction element to be released decreases at a rate ΔP1. The commanded pressure Po decreases to the value Pa at the end of the second stage ② of the gear shift control, as shown in FIG. 3. The commanded value for the pressure Pc of the working fluid to the friction element to be engaged remains at the commanded precharge pressure Pd so as to retain the friction element to be engaged at the same status as obtained when its loss stroke is completed at the end of the first stage of the gear shift control, as shown in FIG. 3.

Figure 6:
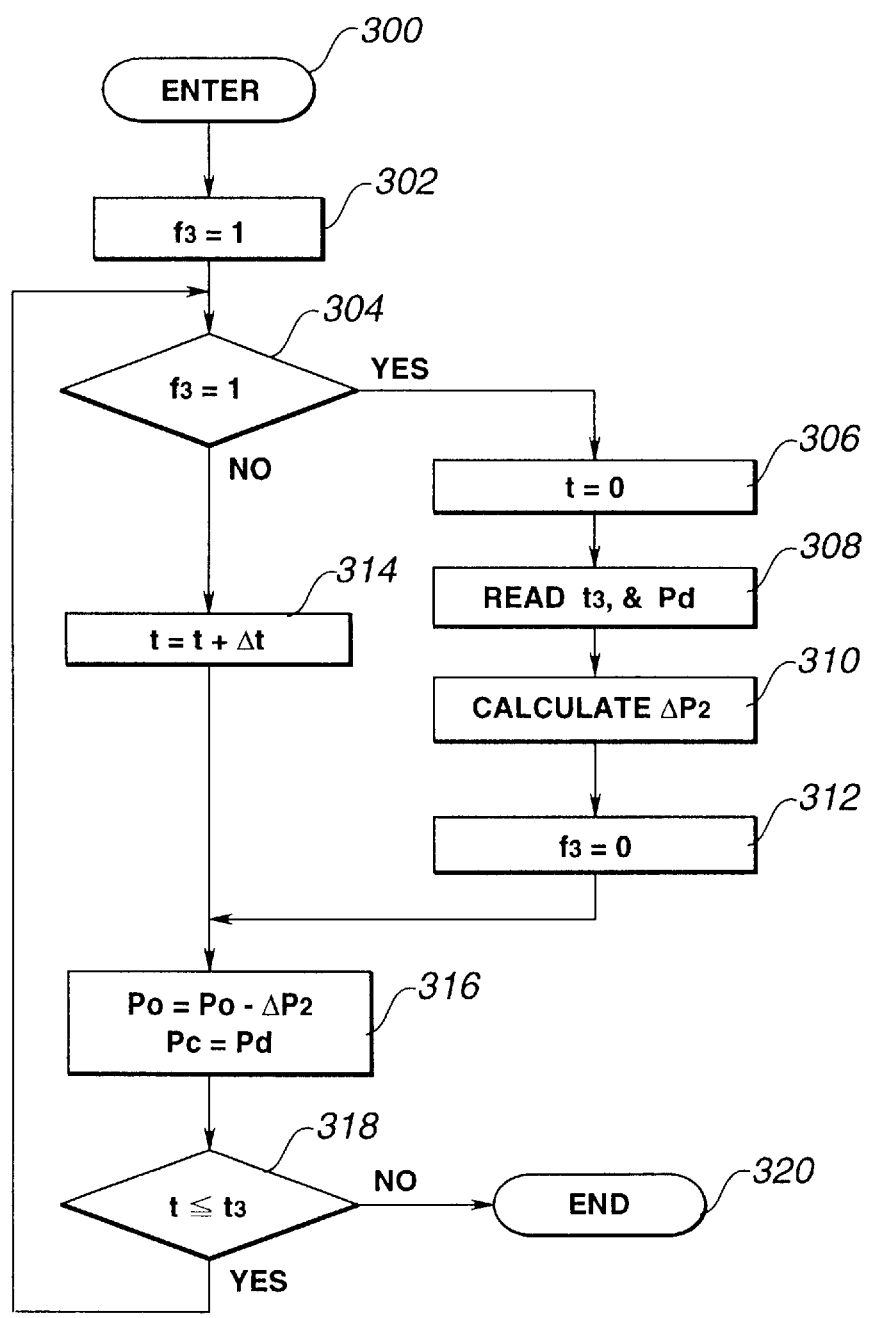
FIG. 6 is a flow diagram illustrating the programming of the digital computer as it is used for the third stage ③ of the gear shift control.

FIG. 6 is a flow diagram illustrating the programming of the digital computer as it is used for the third stage ③ of the gear shift control. The computer program is entered at the point 300 which corresponds to the point 220 of FIG. 5. At the point 302, a flag f3 is set at 1 to indicate that the third stage ③ is initiated. At the point 304, a determination is made as to whether or not the flag f3 has been set. If the answer to this question is "yes", then the program proceeds to the point 306. Otherwise, the program proceeds to the point 314 where the count of the timer t is incremented by one step and then to the point 316. The timer t accumulates a count corresponding to the time elapsed from the initiation of the third stage ③.

At the point 306 in the program, the timer t is reset to zero. At the point 308, the period of time t3 required for the third stage ③ of the gear shift control and the commanded precharge pressure Pd corresponding to the resilient force of the return spring upon the termination of the loss stroke of the friction element to be engaged are read into the computer memory. The period of time t3 required for the third stage ③ of the gear shift control corresponds to such a time as to ensure that the loss stroke of the friction element to be engaged can be completed even when the increase in the pressure Pc of the working fluid to the friction element to be engaged is delayed to the greatest possible extent in the first stage ① of the gear shift control. The pressure Pd corresponds to the working fluid pressure required to complete the loss stroke of the friction element to be engaged. At the point 310, the central processing unit calculates the gradient ΔP2 at which the pressure Po of the working fluid to the friction element to be released decreases by a spare pressure α from the calculated pressure value Pa to the pressure Poo during the period of time t3. At the point 312, the flag f3 is cleared to zero. Following this, the program proceeds to the point 316.

At the point 316 in the program, the commanded value for the pressure Po of the working fluid to the friction element to be released is decreased by the calculated gradient value ΔP2 and the commanded value Pc for the pressure of the working fluid to the friction element to be engaged is set at the commanded precharge pressure Pd read at the point 308. At the point 318, a determination is made as to whether or not the timer count t is equal to or less than the time t3. If the answer to this question is "yes", then the program is returned to the point 304. Otherwise, the program proceeds to the end point 320.

During the period of time t3 of the third stage ③ of the gear shift control, the commanded value for the pressure Po of the working fluid to the friction element to be released decreases at a rate ΔP2 to the pressure Poo. Thus, the friction element to be released is still held engaged at the end of the third stage ③ of the gear shift control. The commanded value for the pressure Pc of the working fluid to the friction element to be engaged remains at the pressure Pd so as to retain the friction element to be engaged at the same status as obtained when its loss stroke is completed at the end of the first stage of the gear shift control, as shown in FIG. 3. This status permits a torque phase to start at the following stage of the gear shift control.

Figure 7:
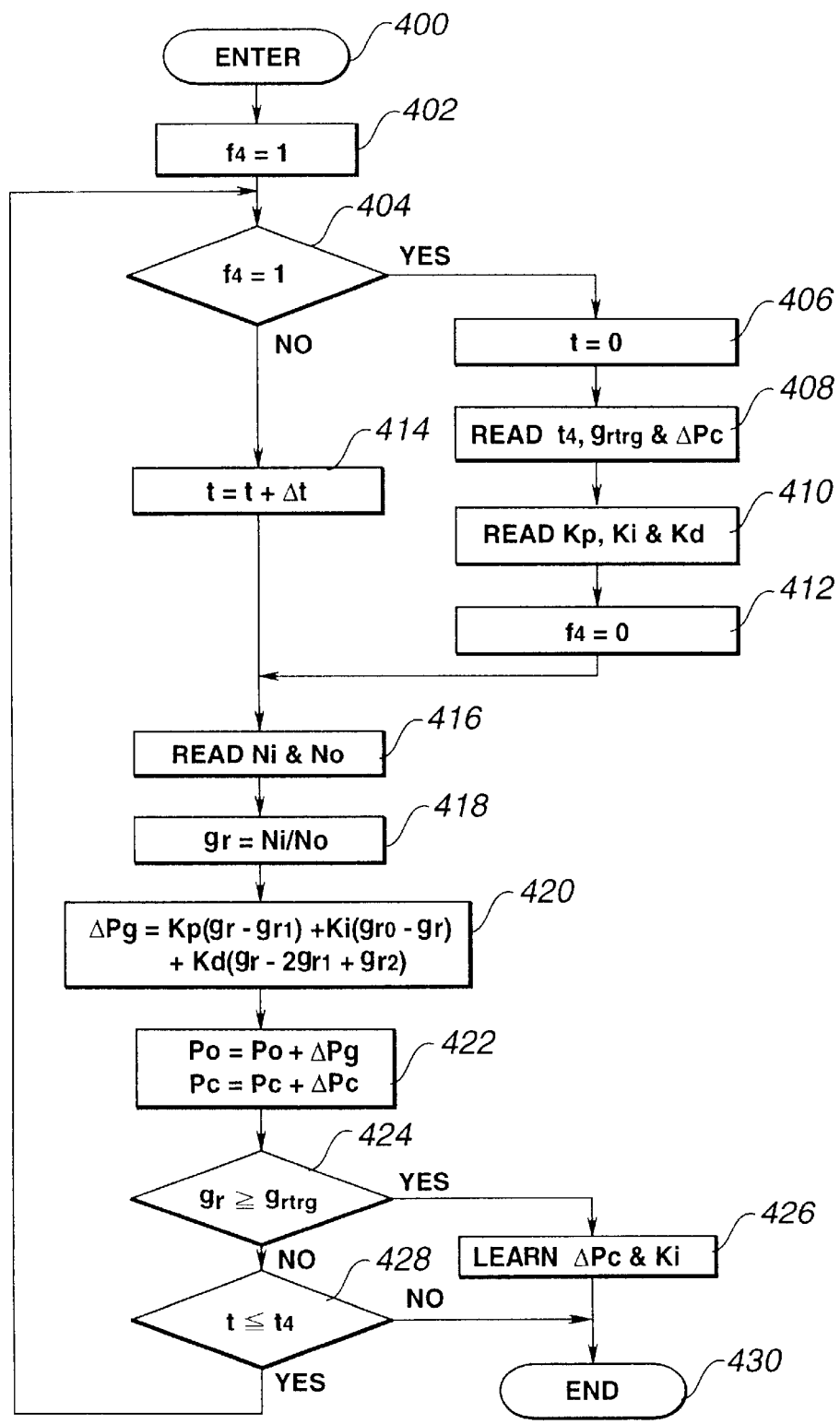
FIG. 7 is a flow diagram illustrating the programming of the digital computer as it is used for the fourth stage ④ of the gear shift control.

FIG. 7 is a flow diagram illustrating the programming of the digital computer as it is used for the fourth stage ④ of the gear shift control. The computer program is entered at the point 400 which corresponds to the point 320 of FIG. 6. At the point 402, a flag f4 is set at 1 to indicate that the fourth stage ④ is initiated. At the point 404, a determination is made as to whether or not the flag f4 has been set. If the answer to this question is "yes", then the program proceeds to the point 406. Otherwise, the program proceeds to the point 414 where the count of the timer t is incremented by one step and then to the point 416. The timer t accumulates a count corresponding to the time (torque phase time) elapsed from the initiation of the fourth stage ②.

At the point 406 in the program, the timer t is reset to zero. At the point 408, the period of time t4 required for the fourth stage ④ of the gear shift control, the gradient ΔPc at which the commanded pressure Pc is to increase, and the gear ratio $g_{rtrg}$ at which the torque phase is terminated and an inertia phase is initiated are read into the computer memory. The time t4 is set, as a fail-safe time, to compel the torque phase to terminate and start the inertia phase when the time t4 elapses even though the torque phase cannot terminate for any reason. The gradient ΔPc is corrected, through learning operation, to terminate the torque phase at an appropriate time to be described later. The gear ratio $g_{rtrg}$ is set at a small value predetermined for each of the modes of the gear shift control. At the point 410, the control constants, that is, the proportional, integral and differential control constants Kp, Ki and Kd, used in calculating the commanded value for the pressure Po of the working fluid to the friction element to be released are read into the computer memory. The proportional and differential control constants Kp and Kd are predetermined constant values. The integral control constant Ki is corrected, through learning operation, to terminate the torque phase at an appropriate time. At the point 412, the flag f4 is cleared to zero. Following this, the program proceeds to the point 416.

At the point 416 in the program, the transmission input and output shaft speeds Ni and No are read into the computer memory. At the point 418, the gear ratio $g_r$ is calculated as $g_r$=Ni/No. At the point 420, the central processing unit calculates a change ΔPg of the commanded value for the pressure Po of the working fluid to the friction element to be released. The change ΔPg, which is required for each cycle of execution of this program to retain the gear ratio $g_r$, at a target gear ratio $g_{r0}$, is calculated from the following equation:

$$\Delta Pg = Kp \cdot (g_r - g_{r1}) + Ki \cdot (g_{r0} - g_r) + Kd \cdot (g_r - 2 g_{r1} + g_{r2})$$

where $g_r$, is the gear ratio calculated in the present cycle of execution of the program, $g_{r1}$ is the gear ratio calculated in the last cycle of execution of the program, and $g_{r2}$ is the gear ratio calculated before two cycles of execution of the program. At the point 422, the commanded value for the pressure Po of the working fluid to the friction element to be released is changed by the calculated change value ΔPg and the commanded value Pc for the pressure of the working fluid to the friction element to be engaged is changed by the calculated gradient value ΔPc. The commanded pressure value Po is increased when the calculated change ΔPg has a positive sign and decreased when the calculated change ΔPg has a negative sign.

At the point 424 in the program, a determination is made as to whether or not the new gear ratio $g_r$ is equal to or greater than the gear ratio $g_{rtrg}$. If the answer to this question is "yes", then the program proceeds to the point 426. Otherwise, the program proceeds to the point 428. At the point 426, the gradient ΔPc and the integral control constant Ki are learned for use in controlling the torque phase time to an appropriate value. This learning operation will be described in greater detail in connection with the flow diagram of FIG. 8. Upon completion of this learning operation, the program proceeds to the end point 430. At the point 428, a determination is made as to whether or not the timer count t is equal to or less than the time t4. If the answer to this question is "yes", then the program is returned to the point 404. Otherwise, the program proceeds to the end point 430.

The commanded pressures Po and Pc are continuously changed in steps until the initiation of the inertia phase (FIG. 3) or the lapse of the time t4 (point 428). Thus, during the torque phase initiated at the end of the third stage of the gear shift control and terminated at the start of the inertia phase, the commanded value of the pressure Pc of the working fluid to the friction element to be engaged increases at a rate of ΔPc and the commanded value of the pressure Po of the working fluid to the friction element to be released is decreased from the value Poo to retain the gear ratio $g_r$ at the target gear ratio $g_{ro}$, as shown in FIG. 3.

Upon completion of the fourth stage ④ of the gear shift control, the gear shift control is placed in the fifth stage where the commanded value for the pressure Po of the working fluid to the friction element to be released is returned to zero at the start of the inertia phase, as shown in FIG. 3. A feedback control is performed to smoothly change the commanded value for the pressure Pc of the working fluid to the friction element from the value $g_{rtrg}$ to the desired gear ratio, as shown in FIG. 3. This feedback control is terminated at the end of the fifth stage ⑤ of the gear shift control. The commanded value for the pressure Pc of the working fluid to the friction element to be engaged is returned to its initial value at the end of the fifth stage ⑤ of the gear shift control, as shown in FIG. 3.

Figure 8:
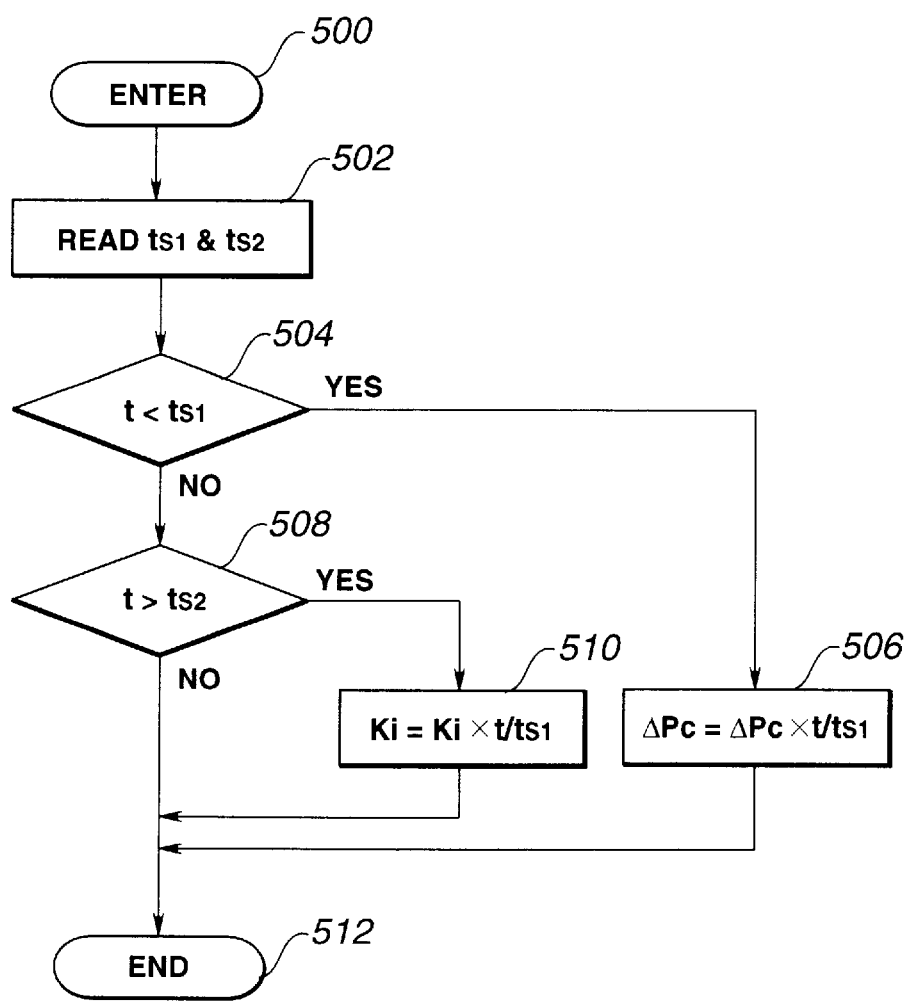
FIG. 8 is a flow diagram illustrating the program of the digital computer as it is used for the learning operation of FIG. 7.

FIG. 8 is a flow diagram illustrating the program of the digital computer as it is used for the learning operation. The computer program is entered at the point 500 which corresponds to the point 426 of FIG. 7. At the point 502, the upper and lower limits $t_{S1}$ and $t_{S2}$ of the appropriate torque phase time are read. For example, the lower limit $t_{S1}$ is 0.10 seconds and the upper limit $t_{S2}$ is 0.15 seconds. At the point 504, a determination is made as to whether or not the torque phase time t measured by the timer t is shorter than the lower limit $t_{S1}$. If the answer to the question is "yes", then it means that the engagement of the friction element to be engaged is advanced with respect to the appropriate time and the program proceeds to the point 506 where the gradient ΔPc is corrected to a smaller value as ΔPc=ΔPc×t/$t_{S1}$ so as to elongate the torque phase time t. Upon completion of this correction, the program proceeds to the end point 512 which corresponds to the point 430 of FIG. 7. If t≧$t_{S1}$, then the program proceeds to another determination step at the point 508. This determination is as to whether or not the torque phase time t measured by the timer t is longer than the upper limit $t_{S2}$. If the answer to this question is "yes", then it means that the disengagement of the friction element to be released is retarded with respect to the appropriate time and the program proceeds to the point 510 where the integral control constant Ki, which determines the rate of decrease of the pressure of the working fluid to the friction element to be released, is corrected to a greater value as Ki=Ki×t/$t_{S1}$ so as to shorten the torque phase time t. Upon completion of this correction, the program proceeds to the end point 512. If t≦$t_{S1}$, then it means $t_{S1}$<t<$t_{S2}$ and the program proceeds to the end point 512. It is, therefore, possible to hold the torque phase time in an appropriate range even though the friction element to be engaged and the friction element to be released have different friction factor changes. Furthermore, the learning operation can avoid hunting.

Figure 9:
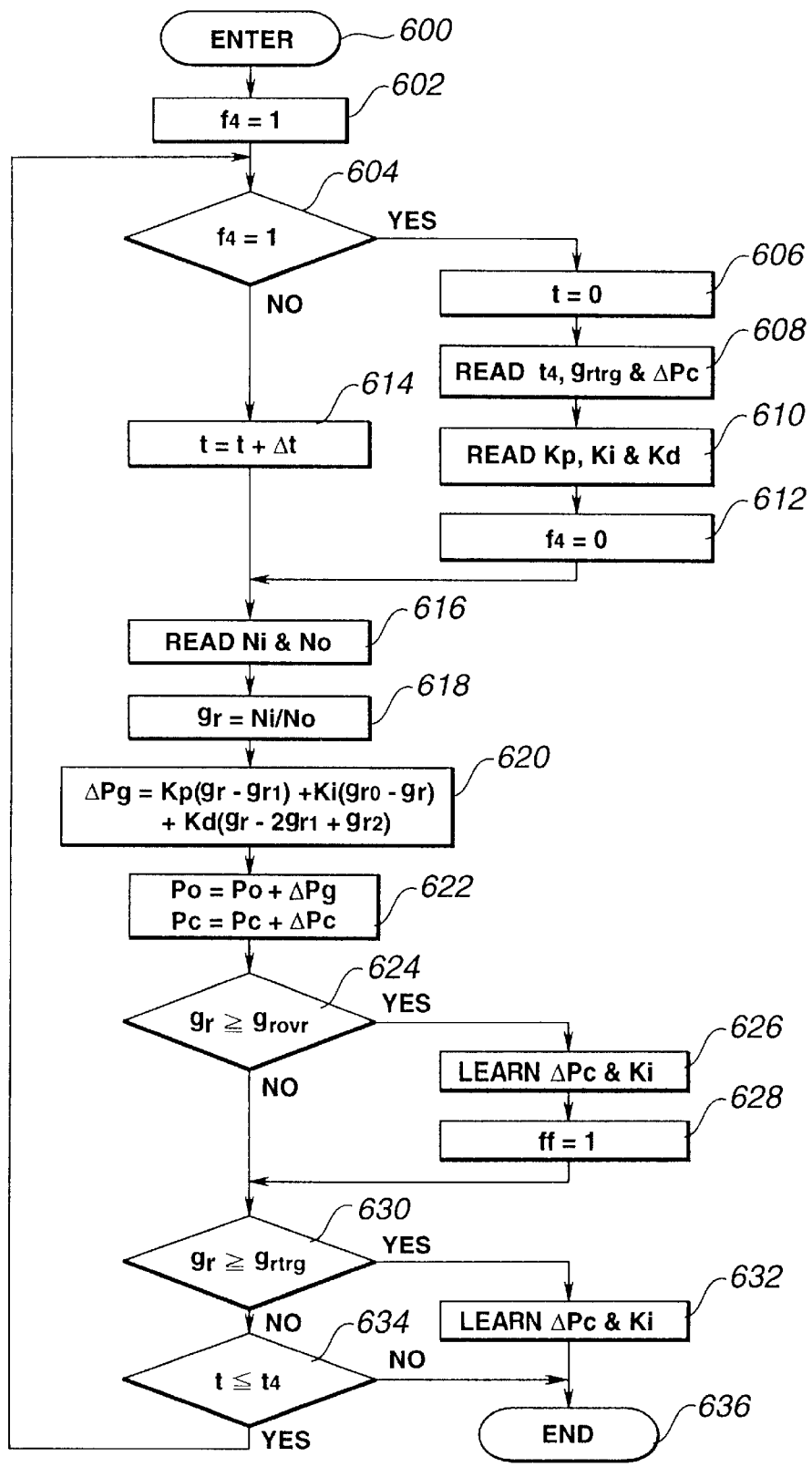
FIG. 9 is a flow diagram illustrating a modified form of the programming of the digital computer as it is used for the fourth stage ④ of the gear shift control.

FIG. 9 is a flow diagram illustrating a modified form of the programming of the digital computer as it is used for the fourth stage ④ of the gear shift control. The computer program is entered at the point 600 which corresponds to the point 320 of FIG. 6. At the point 602, a flag f4 is set at 1 to indicate that the fourth stage ④ is initiated. At the point 604, a determination is made as to whether or not the flag f4 has been set. If the answer to this question is "yes", then the program proceeds to the point 606. Otherwise, the program proceeds to the point 614 where the count of the timer t is incremented by one step and then to the point 616. The timer t accumulates a count corresponding to the time (torque phase time) elapsed from the initiation of the fourth stage ④.

At the point 606 in the program, the timer t is reset to zero. At the point 608, the period of time t4 required for the fourth stage ④ of the gear shift control, the gradient ΔPc at which the commanded pressure PC is to increase, and the gear ratio $g_{rtrg}$ at which the torque phase is terminated and an inertia phase is initiated are read into the computer memory. The time t4 is set, as a fail-safe time, to compel the torque phase to terminate and start the inertia phase when the time t4 elapses even though the torque phase cannot terminate for any reason. The gradient ΔPc is corrected, through learning operation, to terminate the torque phase at an appropriate time to be described later. The gear ratio $g_{rtrg}$ is set at a small value predetermined for each of the modes of the gear shift control. At the point 610, the control constants, that is, the proportional, integral and differential control constants Kp, Ki and Kd, used in calculating the commanded value for the pressure Po of the working fluid to the friction element to be released are read into the computer memory. The proportional and differential control constants Kp and Kd are predetermined constant values. The integral control constant Ki is corrected, through learning operation, to terminate the torque phase at an appropriate time. At the point 612, the flag f4 is cleared to zero. Following this, the program proceeds to the point 616.

At the point 616 in the program, the transmission input and output shaft speeds Ni and No are read into the computer memory. At the point 618, the gear ratio $g_r$ is calculated as $g_r$=Ni/No. At the point 620, the central processing unit calculates a change ΔPg of the commanded value for the pressure Po of the working fluid to the friction element to be released. The change ΔPg, which is required for each cycle of execution of this program to retain the gear ratio $g_r$ at a target gear ratio $g_{r0}$, is calculated from the following equation:

$$\Delta Pg = Kp \cdot (g_r - g_{r1}) + Ki \cdot (g_{r0} - g_r) + Kd \cdot (g_r - 2 g_{r1} + g_{r2})$$

where $g_r$ is the gear ratio calculated in the present cycle of execution of the program, $g_{r1}$ is the gear ratio calculated in the last cycle of execution of the program, and $g_{r2}$ is the gear ratio calculated before two cycles of execution of the program. At the point 622, the commanded value for the pressure Po of the working fluid to the friction element to be released is changed by the calculated change value ΔPg and the commanded value Pc for the pressure of the working fluid to the friction element to be engaged is changed by the calculated gradient value ΔPc. The commanded pressure value Po is increased when the calculated change ΔPg has a positive sign and decreased when the calculated change ΔPg has a negative sign.

At the point 624, a determination is made as to whether or not the new gear ratio $g_r$ is equal to or greater than a gear ratio $g_{rovr}$. If the answer to this question is "yes", then it means the vehicle is racing and the program proceeds to the point 626 where the gradient ΔPc and the integral control constant Ki are learned for use in controlling the torque phase time to an appropriate value. This learning operation will be described in greater detail in connection with the flow diagram of FIG. 10. Upon completion of this learning operation, the program proceeds to the point 628 where a flag ff is set at 1 and then to the point 630. If $g_r$<$g_{rovr}$, then the program proceeds to the point 630.

At the point 630 in the program, a determination is made as to whether or not the new gear ratio $g_r$ is equal to or greater than the gear ratio $g_{rtrg}$. If the answer to this question is "yes", then the program proceeds to the point 632. Otherwise, the program proceeds to the point 634. At the point 632, the gradient ΔPc and the integral control constant Ki are learned for use in controlling the torque phase time to an appropriate value. This learning operation has been described in greater detail in connection with the flow diagram of FIG. 8. Upon completion of this learning operation, the program proceeds to the end point 636. At the point 634, a determination is made as to whether or not the timer count t is equal to or less than the time t4. If the answer to this question is "yes", then the program is returned to the point 604. Otherwise, the program proceeds to the end point 636.

Figure 10:
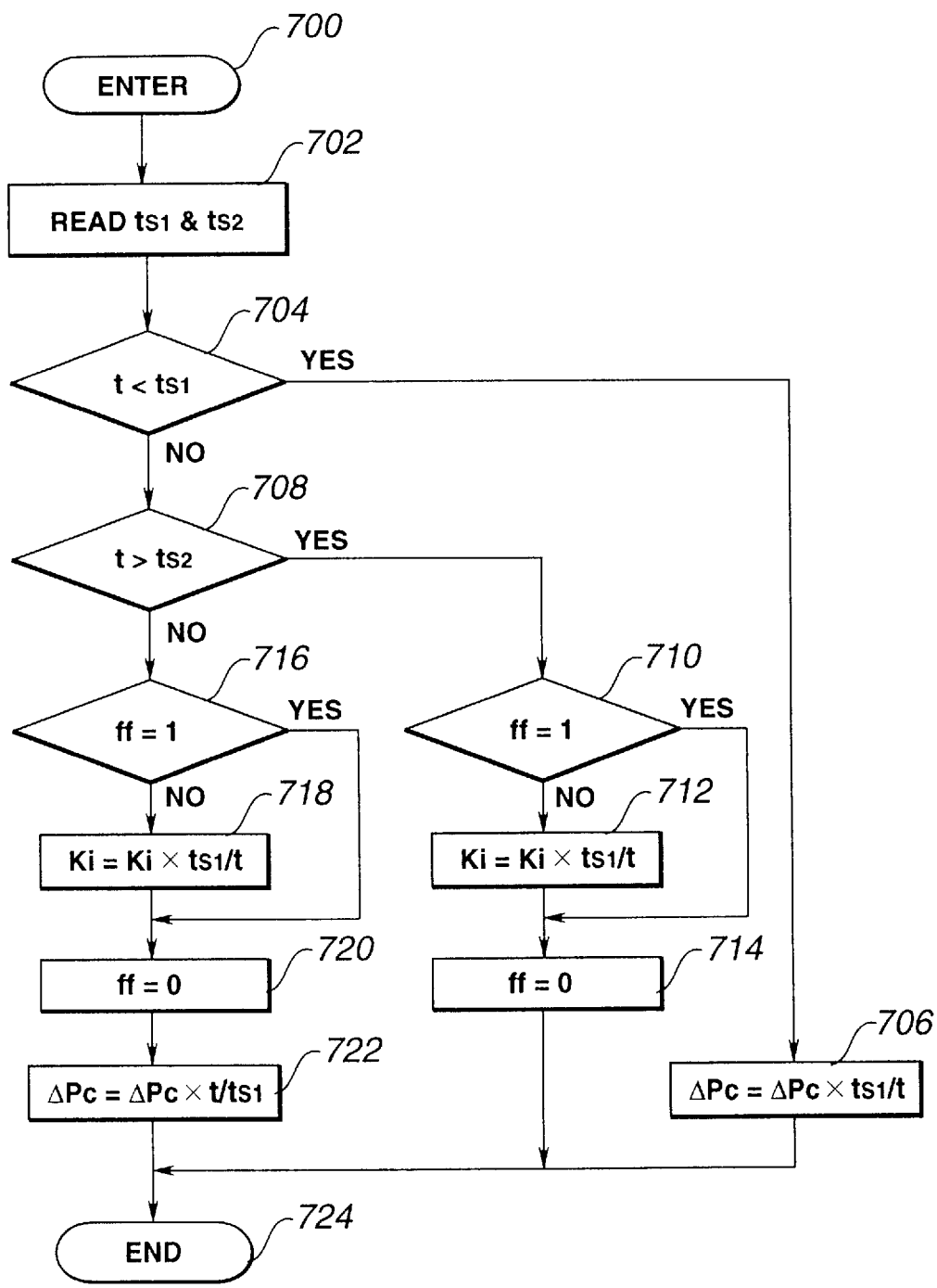
FIG. 10 is a flow diagram illustrating the program of the digital computer as it is used for the learning operation of FIG. 9.

FIG. 10 is a flow diagram illustrating the program of the digital computer as it is used for the learning operation. The computer program is entered at the point 700 which corresponds to the point 626 of FIG. 9. At the point 702, the upper and lower limits $t_{S1}$ and $t_{S2}$ of the appropriate torque phase time are read. For example, the lower limit $t_{S1}$ is 0.10 seconds and the upper limit $t_{S2}$ is 0.15 seconds. At the point 704, a determination is made as to whether or not the torque phase time t measured by the timer t is shorter than the lower limit $t_{S1}$. If the answer to the question is "yes", then it means that the engagement of the friction element to be engaged is advanced with respect to the appropriate time and the program proceeds to the point 706 where the gradient ΔPc is corrected to a greater value as ΔPc=ΔPc×$t_{S1}$/t. Upon completion of this correction, the program proceeds to the end point 724 which corresponds to the point 628 of FIG. 9. If t≧$t_{S1}$, then the program proceeds to another determination step at the point 708. This determination is as to whether or not the torque phase time t measured by the timer t is longer than the upper limit $t_{S2}$. If the answer to this question is "yes", then it means that the disengagement of the friction element to be released is retarded with respect to the appropriate time and the program proceeds to another determination step at the point 710. This determination is as to whether or not the flag ff has been set. If the answer to this question is "yes", then the program proceeds to the point 714 where the flag ff is cleared to zero. Otherwise, the program proceeds to the point 712 where integral control constant Ki, which determines the rate of decrease of the pressure of the working fluid to the friction element to be released, is corrected to a smaller value as Ki=Ki×$t_{S1}$/t. Upon completion of this correction, the program proceeds to the point 714 and hence to the end point 724. If t≦$t_{S2}$, then it means $t_{S1}$<t<$t_{S2}$ and the program proceeds from the point 708 to another determination step at the point 716. This determination is as to whether or not the flag ff has been set. If the answer to this question is "yes", then the program proceeds to the point 720 where the flag ff is cleared to zero. Otherwise, the program proceeds t the point 718 where integral control constant Ki, which determines the rate of decrease of the pressure of the working fluid to the friction element to be released, is corrected to a smaller value as $Ki=Ki \times t_{S1}/t$. Upon completion of this correction, the program proceeds to the point 720 and hence to the end point 722 where the gradient $\Delta Pc$ is corrected to a greater value as $\Delta Pc = \Delta Pc \times t/t_{S1}$. Upon completion of this correction, the program proceeds to the end point 724.

According to the $\Delta Pc$ and $Ki$ learning operation made when the engine is racing, the gradient $\Delta Pc$ at which the pressure Pc of the working fluid to the friction element to be engaged is increased (point 706 or 722) so as to advance the engagement of the friction element to be engaged. It is, therefore, possible to avoid engine racing during the torque phase. When the actual torque phase time t is longer than the upper limit, the gradient $\Delta Pc$ is not increased. The reason for this is that the engine racing does not always depend on the gradient $\Delta Pc$ at which the pressure Pc of the working fluid to the friction element to be engaged.

What is claimed is:

1. A gear shift control apparatus for controlling working fluid pressures applied to operate friction elements in engaged and released states within an automatic transmission coupled to an engine, the apparatus comprising:

means for increasing the pressure of the working fluid to a first one of the friction elements at a first rate to engage the first friction element while decreasing the pressure of the working fluid to a second one of the friction elements at a second rate to release the second friction element so as to produce a gear ratio change;

means for measuring a time elapsed for a torque phase in the gear ratio change; and means for decreasing the first rate when the measured torque phase time is shorter than a predetermined torque phase time value.

2. The gear shift control apparatus as claimed in claim 1, wherein the first rate decreasing means includes means for calculating a ratio of the measured torque phase time with respect to the predetermined torque phase time value, and means for multiplying the first rate by the calculated ratio to calculate a new first rate.

3. The gear shift control apparatus as claimed in claim 2, further including means for detecting engine racing, and means for increasing the first rate when engine racing is detected.

4. The gear shift control apparatus as claimed in claim 3, wherein the first rate increasing means includes means for calculating a ratio of the measured torque phase time with respect to the predetermined torque phase time value, and means for multiplying the first rate by the calculated ratio to calculate a new first rate.

5. The gear shift control apparatus as claimed in claim 1, wherein the gear ratio change producing means includes means for repetitively increasing the pressure of the working fluid to the first friction element by a predetermined amount at uniform intervals to produce the first rate during the torque phase, means for decreasing the pressure of the working fluid to the second friction element, under a feedback control having a gain, to retain an effective transmission gear ratio before the gear ratio change during the torque phase, wherein the first rate decreasing means includes means for correcting the predetermined amount to decrease the first rate.

6. The gear shift control apparatus as claimed in claim 5, further including means for detecting engine racing, and means for increasing the first rate when engine racing is detected.

7. The gear shift control apparatus as claimed in claim 6, wherein the first rate increasing means includes means for calculating a ratio of the measured torque phase time with respect to the predetermined torque phase time value, and means for multiplying the first rate by the calculated ratio to calculate a new first rate.

8. The gear shift control apparatus as claimed in claim 1, further including means for detecting engine racing, and means for increasing the first rate when engine racing is detected.

9. The gear shift control apparatus as claimed in claim 8, wherein the first rate increasing means includes means for calculating a ratio of the measured torque phase time with respect to the predetermined torque phase time value, and means for multiplying the first rate by the calculated ratio to calculate a new first rate.

10. A gear shift control apparatus for controlling working fluid pressures applied to operate friction elements in engaged and released states within an automatic transmission coupled to an engine, the apparatus comprising:

means for increasing the pressure of the working fluid to a first one of the friction elements at a first rate to engage the first friction element while decreasing the pressure of the working fluid to a second one of the friction elements at a second rate to release the second friction element so as to produce a gear ratio change;

means for measuring a time elapsed for a torque phase in the gear ratio change; and means for increasing the second rate when the measured torque phase time is longer than a predetermined torque phase time value.

11. The gear shift control apparatus as claimed in claim 10, further including means for detecting engine racing, and means for increasing the first rate when engine racing is detected.

12. The gear shift control apparatus as claimed in claim 11, wherein the first rate increasing means includes means for calculating a ratio of the measured torque phase time with respect to the predetermined torque phase time value, and means for multiplying the first rate by the calculated ratio to calculate a new first rate.

13. The gear shift control apparatus as claimed in claim 10, wherein the gear ratio change producing means includes means for repetitively increasing the pressure of the working fluid to the first friction element by a predetermined amount at uniform intervals to produce the first rate during the torque phase, means for decreasing the pressure of the working fluid to the second friction element, under a feedback control having a gain, to retain an effective transmission gear ratio before the gear ratio change during the torque phase, wherein the second rate increasing means includes means for correcting the feedback control gain to increase the second rate.

14. The gear shift control apparatus as claimed in claim 13, further including means for detecting engine racing, and means for increasing the first rate when engine racing is detected.

15. The gear shift control apparatus as claimed in claim 14, wherein the first rate increasing means includes means for calculating a ratio of the measured torque phase time with respect to the predetermined torque phase time value, and means for multiplying the first rate by the calculated ratio to calculate a new first rate.

16. A gear shift control apparatus for controlling working fluid pressures applied to operate friction elements in engaged and released states within an automatic transmission coupled to an engine, the apparatus comprising:

means for increasing the pressure of the working fluid to a first one of the friction elements at a first rate to engage the first friction element while decreasing the pressure of the working fluid to a second one of the friction elements at a second rate to release the second friction element so as to produce a gear ratio change;

means for measuring a time elapsed for a torque phase in the gear ratio change;

means for decreasing the first rate when the measured torque phase time is shorter than a lower limit of a predetermined torque phase time range; and means for increasing the second rate when the measured torque phase time is longer than an upper limit of the predetermined torque phase time range.

17. The gear shift control apparatus as claimed in claim 16, wherein the first rate decreasing means includes means for calculating a ratio of the measured torque phase time with respect to the lower limit of the predetermined torque phase time range, and means for multiplying the first rate by the calculated ratio to calculate a new first rate.

18. The gear shift control apparatus as claimed in claim 17, further including means for detecting engine racing, and means for increasing the first rate when engine racing is detected.

19. The gear shift control apparatus as claimed in claim 18, wherein the first rate increasing means includes means for calculating a ratio of the measured torque phase time with respect to the lower limit of the predetermined torque phase time range, and means for multiplying the first rate by the calculated ratio to a calculate a new first rate.

20. The gear shift control apparatus as claimed in claim 16, wherein the gear ratio change producing means includes means for repetitively increasing the pressure of the working fluid to the first friction element by a predetermined amount at uniform intervals to produce the first rate during the torque phase, means for decreasing the pressure of the working fluid to the second friction element, under a feedback control having a gain, to retain an effective transmission gear ratio before the gear ratio change during the torque phase, wherein the first rate decreasing means includes means for correcting the predetermined amount to decrease the first rate, and wherein the second rate increasing means includes means for correcting the feedback control gain to increase the second rate.

21. The gear shift control apparatus as claimed in claim 20, further including means for detecting engine racing, and means for increasing the first rate when engine racing is detected.

22. The gear shift control apparatus as claimed in claim 21, wherein the first rate increasing means includes means for calculating a ratio of the measured torque phase time with respect to the lower limit of the predetermined torque phase time range, and means for multiplying the first rate by the calculated ratio to calculate a new first rate.

23. The gear shift control apparatus as claimed in claim 16, further including means for detecting engine racing, and means for increasing the first rate when engine racing is detected.

24. The gear shift control apparatus as claimed in claim 23, wherein the first rate increasing means includes means for detecting a rate at which the pressure of the working fluid to the first friction element changes, means for calculating a ratio of the measured torque phase time with respect to the lower limit of the predetermined torque phase time range, and means for multiplying the first rate by the calculated ratio to calculate a new first rate.

* * * * *